May 9, 1967 — J. A. HANSEN, JR — 3,318,229
STORAGE STRUCTURE
Filed July 20, 1965 — 2 Sheets-Sheet 1
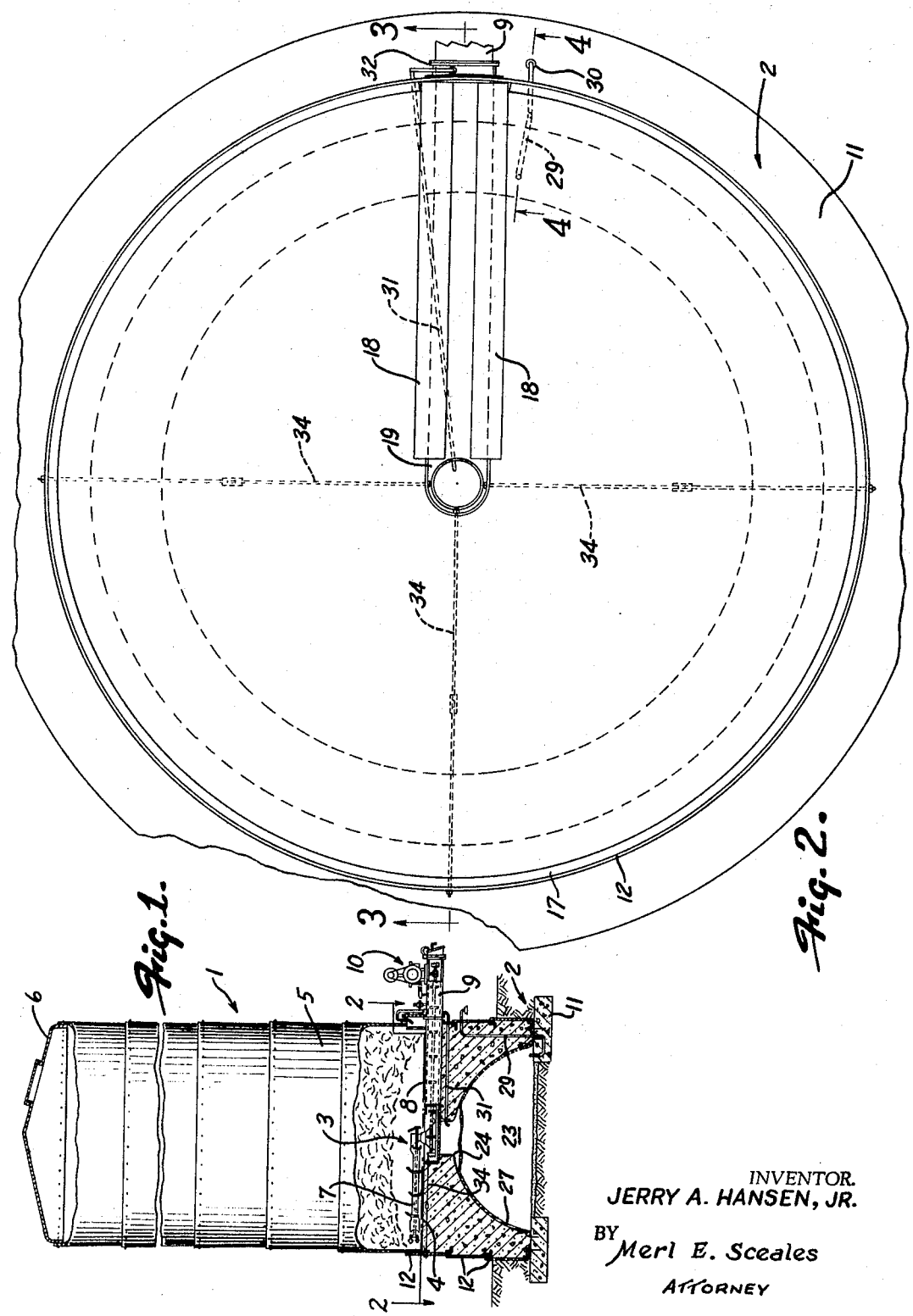
INVENTOR.
JERRY A. HANSEN, JR.
BY Merl E. Sceales
ATTORNEY May 9, 1967  J. A. HANSEN, JR  3,318,229
STORAGE STRUCTURE
Filed July 20, 1965  2 Sheets-Sheet 2
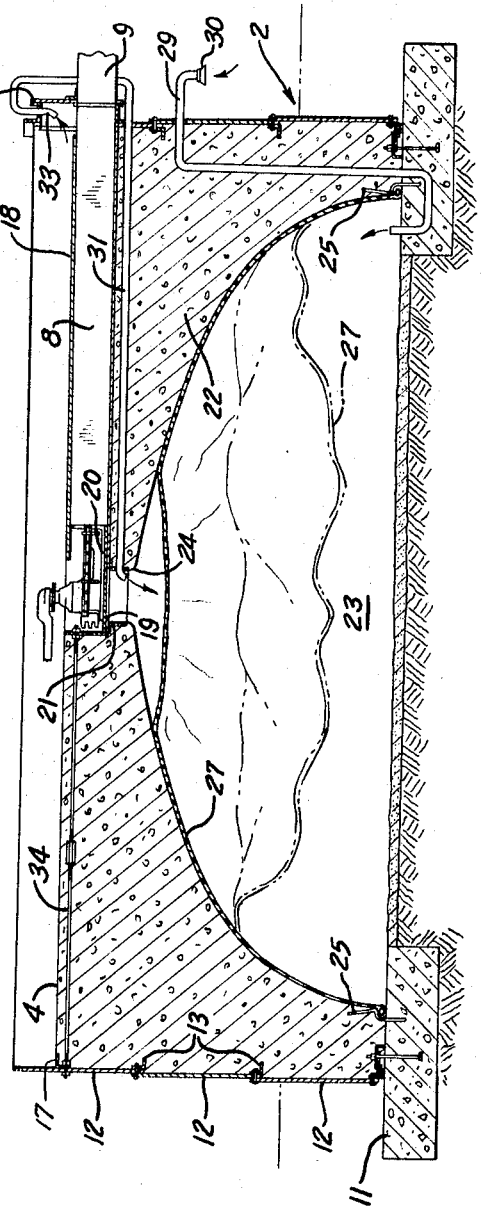
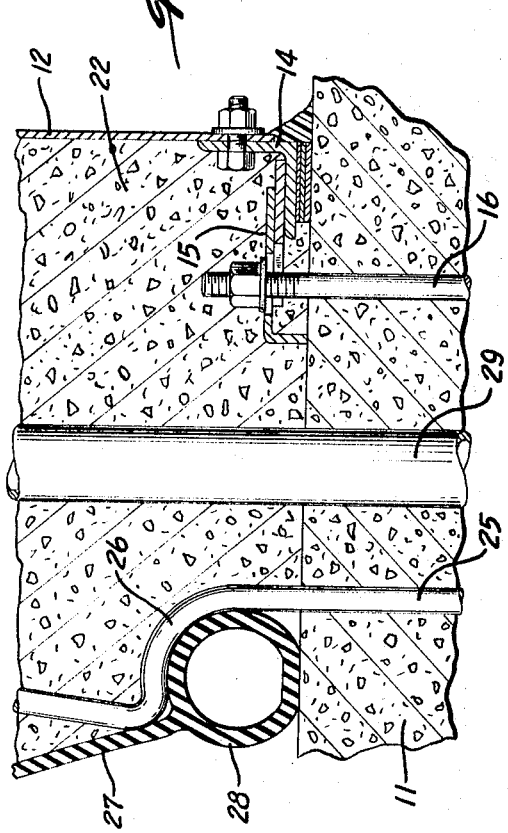
INVENTOR.
JERRY A. HANSEN, JR.
BY Merl E. Sceales
ATTORNEY

United States Patent Office 3,318,229
Patented May 9, 1967

3,318,229
STORAGE STRUCTURE
Jerry A. Hansen, Jr., Arlington Heights, Ill., assignor to A. O. Smith Harvestore Products, Inc., Arlington Heights, Ill., a corporation of Delaware
Filed July 20, 1965, Ser. No. 473,387
13 Claims. (Cl. 99—235)

This invention relates to a storage structure and more particularly to a breathing system for a sealed storage structure.

Food material, such as silage, corn, sugar and the like, tend to spoil or deteriorate if exposed in storage to the atmosphere. To minimize spoilage, food materials are frequently stored in a hermetically sealed structure which will prevent oxygen from contacting the material and thereby minimize spoilage. In a sealed storage structure such as that disclosed in U.S. Patent 2,635,770, the stored material is removed from the structure by a bottom unloading mechanism including a cutter arm which rotates around the floor of the structure and cuts or dislodges the material and conveys it to a radial extending trough. A conveying mechanism located in the trough conveys the material to the exterior of the structure.

With a sealed storage structure, it is necessary to balance the internal and external pressure to prevent undue stress on the walls of the structure. For example, the pressure within the structure may increase due to the generation of gases, such as carbon dioxide, by the stored material, or variations in temperature and/or atmospheric pressure may cause a substantial differential between the internal and external pressures. In either situation it is necessary to equalize the interior and exterior pressures without outside air contacting the stored material, which would destroy the sealed nature of the structure.

To balance the interior and exterior pressures in a sealed storage structure, a breathing system is generally utilized. The breathing system may consist of an expandable bag which is located in the upper end of the structure. The interior of the bag is connected through an opening in the roof of the structure to the atmosphere and the outer surface of the bag is exposed to the internal pressure within the storage structure. As the pressure differential between the interior and exterior varies, the bag will expand and contract to equalize the pressure and yet prevent air from contacting the stored material.

As the breather bag is generally located at the top of the structure and has a substantial size, it occupies a space which normally could be used for storage of material. In addition, when filling or loading the storage structure or silo the breather bag must be moved to a position where it will not interfere with the loading operation. Therefore a mechanism must be included in the storage structure for moving the bag between loading and normal operating positions, and to operate this bag-moving mechanism a man must climb to the top of the structure.

The present invention is directed to a breathing system for a sealed storage structure in which a pressure responsive member is located within a cavity in the foundation. One surface of the member is exposed to atmospheric pressure while the other surface of the member is exposed to the internal pressure of the storage structure or silo. As the differential in pressure varies, the pressure responsive member will flex to equalize the pressures and thereby maintain a balance between interior and external pressures.

The location of the pressure responsive member or diaphragm in the cavity in the foundation has definite advantages over a breather bag located in the top of the silo. The pressure responsive member, being located within the foundation cavity, occupies a normally unused space and thus does not detract from the overall storage capacity of the silo. In addition, as the pressure responsive member is located within the foundation, it is not necessary to move or adjust the position of the member when filling or removing the silage.

Other objects and advantages will appear in the course of the following description.

The drawings illustrate the best mode presently contemplated of carrying out the invention.

FIGURE 1 is a side elevation of a silo or storage structure, with parts broken away, and fabricated in accordance with the invention.

FIG. 2 is a horizontal section taken along the line 2—2 of FIG. 1 with the unloader removed.

FIG. 3 is a vertical section taken along line 3—3 of FIG. 2; and

FIG. 4 is an enlarged vertical section taken along line 4—4 of FIG. 2.

The drawings illustrate a storage structure or silo 1 which is mounted on a foundation 2. The silo 1 is adapted to contain a stored material, such as silage, corn, sugar, flour and the like, which is removed from the silo by an unloader mechanism 3 mounted above the floor 4 of the silo.

The silo 1 includes a generally cylindrical shell 5 and the open upper end of the shell is enclosed by a roof 6. A suitable filler opening is provided in the roof for loading materials into the silo.

The unloading mechanism 3 is similar to that described in the U.S. Patent 2,635,770 to Tiedeman, and includes a rotatable cutter arm 7 which is mounted for rotation around the central axis of the silo. The cutter arm 7 serves to cut and dislodge the silage or other stored material and convey the same to a radially extending trough 8. A conveyor mechanism 9 is located within the trough and serves to convey the dislodged silage to the exterior. Both the cutter arm 7 and the conveyor 8 are operated by a drive mechanism 10 which is located on the outside of the silo 1.

While the drawings illustrate the silo 1 having an unloader mechanism 3, it is contemplated that in some situations the bottom unloading mechanism may not be employed and the breather system of the invention will operate effectively whether or not an unloading mechanism is utilized.

Foundation 2 includes a footing 11 which is located beneath grade and supports the cylindrical shell 5. The shell 5 includes three generally cylindrical foundation sections 12, with each foundation section being formed of a series of generally curved plates or panels. The panels which form the shells 5 are preferably made of steel coated with a corrosion resistant material such as vitreous enamel. The overlapping edges of the panels are joined together by bolts, and the joints are sealed with a suitable mastic to provide a hermetically sealed structure.

The overlapping edges of the foundation sections 12 of shell 5 are stiffened by angle rings 13. In addition, an angle ring 14 is bolted to the lower edge of the lowermost section 12 and rests on the footing 11. The lowermost section 12 is anchored to the footing by a series of L-shaped floor brackets 15 which bear against the horizontal flange of the angle 14 and are secured to the footing 11 by a series of anchor rods 16.

An annular angle member 17 is secured to the upper foundation section 12 and a pair of trough plates 18 are mounted flush with the angle member 17 and partially cover the radially extending trough 8. As best shown in FIG. 2, the central portion of the trough 8 is formed with an opening 19, and the opening 19 is closed off by a removable plate 20. An angle ring 21 is secured to the lower surface of the trough 8 bordering the central opening 19.

According to the invention the foundation includes a concrete base 22 which is supported on the footing 11 and the upper surface of base 22 forms the floor 4. The internal wall of concrete base 22 defines a generally dome-shaped cavity 23, which extends across the foundation, and the base 22 is provided with a central opening 24 which communicates with the opening 19 in the trough 8.

As shown in FIGS. 3 and 4 a series of bent rods 25 are arranged in circumferentially spaced relation around the annular footing 11. The lower ends of the rods are imbedded within the footing while the upper ends of the rods are imbedded within the concrete base 22. The bent portions of the rods 25 define a recess beneath the inner lower edge of base 22.

A pressure responsive member, or diaphragm 27, is located within the dome-shaped cavity 23. The periphery of the bag or diaphragm 27 is connected to an inflatable pneumatic tube 28, which is disposed within the recess 26 defined by the bent rods 25. With the tube 28 inflated, the pressure of the air or other gas within the tube serves to force the tube outwardly into the recess 26 and provides an air-tight seal between the tube 28 and the concrete base 22. The diaphragm 27, in its expanded condition, has a convex shape and complements the dome-shaped cavity 23. Diaphragm 27 is formed of a flexible material which preferably is not resilient and will not stretch to any appreciable degree. In use, the diaphragm will collapse and expand in accordance with pressure variations, but the material will not, in itself, stretch and contract.

According to the invention, the upper surface of the diaphragm is exposed to the pressure within the storage structure or silo 1, while the lower surface of the diaphragm 27 is exposed to atmospheric pressure. In this regard, a plastic vent pipe 29 provides communication between the lower surface of the diaphragm 27 and the atmosphere. As shown in FIG. 2 the inner end of vent pipe 29 communicates with the lower portion of cavity 23 beneath the bag or diaphragm 27 and the pipe extends downwardly within footing 11 beneath rods 26, then upwardly with base 22 and then outwardly through the foundation sheet 12. The outer end of vent pipe 29 is located above grade and is bent downwardly and provided with a filter cap 30.

To expose the upper surface of the diaphragm 27 to the pressure within the silo 1, a pipe 31 is connected to the flange 21 and extends horizontally through base 22 to the exterior of the silo. The outer portion of pipe 31 extends vertically along the outside of the silo 1 and then inwardly within the channel-shaped door frame 32 bordering the unloader access door. With this construction the end 33 of pipe 31 communicates with the interior of the silo 1 and yet is located in a position where it will not contact the stored material. Thus the gas pressure within the silo 1 is exerted through the pipe 31, and against the upper surface of the diaphragm 27.

Any variation or differential between internal and external pressure is balanced by flexing of the diaphragm 27. As previously mentioned, pressure on the interior of the silo 1 may vary considerably from the atmospheric pressure due to weather conditions or to the generation of carbon dioxide by the contained material. The diaphragm 27 provides a breather system which equalizes the internal and external pressure and eliminates any undue stress on the storage structure or silo.

For example, if the atmospheric pressure exceeds the internal pressure of silo 1, the pressure differential will expand diaphragm 27 upward against the wall of base 22 as shown in FIG. 3. Conversely, if the pressure within silo 1 is greater than atmospheric pressure, the pressure differential will tend to collapse or flex the diaphragm 27 downwardly in cavity 23, away from base 22, as shown by the phantom lines in FIG. 3.

The large convex bag or diaphragm 27 which is located within the dome-shaped cavity provides a substantial surface area against which the internal and external pressures can act. This large surface area permits the bag to effectively balance wide differentials in internal and external pressure.

To install the breather system of the invention, the footing 11 is poured at a suitable level beneath the grade depending on the particular frost penetration in the locality. During pouring of the footing, the anchor rods 16, as well as the bent rods 25, are properly positioned before the concrete has set.

After the footing has set, the foundation sheets 12 are erected on the footing 11 and the trough 8 is assembled to the foundation sheets. A series of tie rods 34 are connected between the trough 8 and the foundation sheets 12 to support the trough during the pouring of the concrete base 22.

An inflatable bag having an inflatable rim is then positioned within the assembled foundation sections, and the rim is inflated and positioned beneath the bent portions of the rods 25. With the rim properly positioned, a disc in the neck of the bag is positioned within the opening 19 in the trough and the bag is then inflated so that it takes a dome-like shape. After the bag has been properly inflated, a layer of concrete can be applied to the upper surface of the bag by a conventional gunnite technique. After setting, the layer of concrete provides a form for subsequent pouring of the concrete base 22.

After the layer of concrete has set, the bag and tube are deflated and removed from the structure through the opening 19. Subsequently, the concrete base 22 is poured over the hardened concrete form. Following this, the shell of the silo is erected in a conventional manner.

The present invention provides a breathing system for a sealed storage structure which has advantages over the normal type of breather bag structure which is located in the top portion of the silo. By locating the breather bag or diaphragm within a cavity in the foundation, the entire storage structure is available for storage of material. Furthermore, the location of the bag within the cavity in the foundation does not interfere with the loading or unloading operation so that the bag can be permanently positioned and does not have to be moved during loading or unloading operations.

The breathing system is adapted for use with a sealed storage structure employing a bottom unloading mechanism which rotates over the floor of the silo. In this case, the pressure connected to the interior of the silo is made through the foundation, then upwardly along the outside of the silo to a level above the unloader and then inwardly to the interior of the silo so that it will not interfere with the rotation or operation of the unloading mechanism.

Various modes of carrying out the invention are contemplated as being within the scope of the following claims particularly pointing out and distinctly claiming the subject matter which is regarded as the invention.

I claim:

1. A storage structure, comprising a vessel to contain a stored material, a foundation to support the vessel, said foundation defining a chamber located beneath the level of said stored material, a pressure responsive member disposed within the chamber, means for exposing one surface of the pressure responsive member to atmospheric pressure, and means for exposing the opposite surface of the pressure responsive member to the internal pressure of the vessel whereby the pressure responsive member will balance variations in pressure between the atmosphere and said internal pressure.

2. A storage structure, comprising a vessel to contain a stored material, a foundation to support the storage structure with the upper portion of the foundation defining a floor to support the stored material, means associated with the foundation and defining a chamber located beneath the level of said floor, unloading means disposed to move across the floor to dislodge the stored material and move the stored material to the exterior of the vessel, a pressure responsive member located within the chamber, means for exposing one surface of the pressure responsive member to atmospheric pressure, and conduit means having one end communicating with said chamber and exposed to the opposite surface of the pressure responsive member and said conduit means extending outwardly from said chamber through the foundation and then upwardly along the exterior of said vessel above the level of the floor and said conduit means having its opposite end communicating with the interior of the vessel above the level of the unloading means.

3. A storage structure, comprising a vessel to contain a stored material, a foundation to support the vessel with the upper portion of the foundation defining a floor to support the stored material, said foundation including a chamber located beneath the level of said floor, a pressure responsive member extending across the chamber and disposed in sealing engagement with the portion of the foundation bordering the chamber and dividing said chamber into a first compartment and a second compartment, first conduit means connecting the atmosphere to the first compartment to thereby expose one surface of the pressure responsive member to atmospheric pressure, and second conduit means connecting the interior of the vessel with the second compartment to thereby expose the opposite surface of the pressure responsive member to the internal pressure of the vessel.

4. In a storage structure, a vessel to contain a stored material, a foundation to support the vessel with the upper portion of the foundation defining a floor to support the stored material, said foundation having a chamber located beneath the level of said floor, and said foundation having an opening located substantially at the center of the vessel and providing communication between the chamber and the interior of the vessel, means for removably enclosing the opening in the foundation, a pressure responsive member located within the chamber, means for exposing one surface of the pressure responsive member to the atmospheric pressure, and means for exposing the opposite surface of the pressure responsive member to the internal pressure of the vessel.

5. In a storage structure, a vessel to contain a stored material, a foundation to support the vessel with the upper portion of the foundation defining a floor to support the stored material, said foundation having a chamber located beneath the level of said floor, and said foundation having an opening located substantially at the center of the vessel and providing communication between the chamber and the interior of the vessel, means for removably enclosing the opening in the foundation, unloading means located within the vessel and disposed to move across the floor to dislodge the stored material and move the stored material to the exterior of the vessel, a pressure responsive member located within the chamber, conduit means connected to said opening for exposing one surface of the pressure responsive member to the internal pressure of the vessel, and second conduit means for exposing the opposite surface of the pressure responsive member to atmospheric pressure.

6. A storage structure, comprising a vessel to contain a stored material, a foundation to support the storage structure with the upper portion of the foundation defining a floor to support the stored material, said foundation having an internal wall defining a chamber located concentrically with the axis of the vessel and said foundation having an annular recess in said internal wall, a pressure responsive member located within the chamber and having a peripheral rim disposed in sealing engagement with the recess to thereby divide the chamber into a first compartment and a second compartment, first conduit means providing communication between the first compartment and the atmosphere to thereby expose one surface of the pressure responsive member to atmospheric pressure, and second conduit means providing communication between the second compartment and the interior of the vessel to thereby expose the opposite surface of the pressure responsive member to the internal pressure of the vessel.

7. The structure of claim 6 in which the peripheral rim of the pressure responsive member is a pneumatic tube.

8. In a storage structure, a footing, a foundation supported on the footing with the upper end of the foundation defining a floor and said foundation having an internal wall defining a cavity located beneath the floor, said internal wall provided with an annular recess located adjacent the footing, a vessel to contain a stored material and supported on the foundation, a flexible pressure responsive diaphragm disposed within the cavity with the peripheral edge portion of the diaphragm being located in sealing engagement with said recess, first conduit means for exposing the upper surface of the diaphragm to the internal pressure of the vessel, and second conduit means for exposing the lower surface of the diaphragm to atmospheric pressure.

9. The structure of claim 8 and including a series of circumferentially spaced anchor rods connecting the footing and the foundation with each anchor rod having a bend and said rods being disposed radially outward and upwardly of said recess.

10. A storage structure, a footing, a foundation supported on the footing with the upper end of the foundation defining a floor and said foundation having an internal wall defining a cavity located beneath the floor, said internal wall provided with an annular recess located adjacent the footing, a flexible pressure responsive diaphragm disposed within the caivty with the peripheral edge portion of the diaphragm being located in sealing engagement within said recess, first conduit means extending within the footing and beneath the recess and connecting the lower portion of the cavity with the atmosphere whereby atmospheric pressure is applied to the lower surface of the diaphragm, a sealed vessel to contain a stored material and supported on said foundation, and second conduit means for exposing the upper surface of the diaphragm to the internal pressure of the vessel.

11. In a storage structure, a footing, a foundation supported on the footing with the upper end of the foundation defining a floor and said foundation having an internal wall defining a cavity located beneath the floor, said internal wall provided with an annular recess located adjacent the footing, a vessel to contain a stored material and supported on the foundation, a flexible pressure responsive diaphragm disposed within the cavity with the peripheral edge portion of the diaphragm being located in sealing engagement within said recess, first conduit means for exposing the lower surface of the pressure responsive member to atmospheric pressure, and second conduit means communicating with the upper portion of the cavity and extending generally radially outward through the foundation to the exterior of the vessel, then upwardly along the outer surface of the vessel, and then inwardly through the vessel wall to a location above said floor whereby the internal pressure of the vessel is applied to the upper surface of the diaphragm.

12. In a storage structure, a vessel to contain a stored material, a foundation to support the vessel with the upper portion of the foundation defining a floor to support the stored material, said foundation having a chamber located beneath the level of said floor, said foundation having a radial trough extending from the center of the vessel to the exterior, conveyor means located within the trough for conveying stored material within the trough to the exterior, material dislodging means disposed to move across the floor and dislodge the stored material and deposit the dislodged material in said trough, said foundation having a passage providing communication between the chamber and the central portion of said trough, closure means for removably enclosing the upper end of the passage, a pressure responsive diaphargm disposed across the chamber and dividing the chamber into an upper compartment and a lower compartment, said upper compartment being connected to said passage, first conduit means providing communication between the interior of the vesesel and the passage to thereby expose the upper surface of the diaphragm to the internal pressure of the vessel, and second conduit means connecting the lower compartment with the atmosphere for exposing the opposite surface of the diaphragm to atmospheric pressure.

13. The structure of claim 12 in which the first conduit means extends outwardly beneath the floor to the exterior of the foundation, then upwardly along the outer wall of the vessel to a level above the floor and then inwardly through the vessel wall to the interior of the vessel.

References Cited by the Examiner

UNITED STATES PATENTS

| 3,076,403 | 2/1963 | Behlen | 99—235 |
| 3,092,010 | 6/1963 | O'Dell | 99—235 |
| 3,193,058 | 7/1965 | Ebbinghaus | 99—235 |
| 3,211,303 | 10/1965 | Linde et al. | 99—235 |

IRVING BUNEVICH, *Primary Examiner.*
ROBERT W. JENKINS, *Examiner.*